(12) United States Patent
Nomura et al.

(10) Patent No.: US 11,277,692 B2
(45) Date of Patent: Mar. 15, 2022

(54) SPEECH INPUT METHOD, RECORDING MEDIUM, AND SPEECH INPUT DEVICE

(71) Applicant: Panasonic Corporation, Osaka (JP)

(72) Inventors: Kazuya Nomura, Osaka (JP); Hiroki Furukawa, Osaka (JP); Takeo Kanamori, Osaka (JP); Shinichi Yuzuriha, Osaka (JP)

(73) Assignee: PANASONIC CORPORATION, Osaka (JP)

( * ) Notice: Subject to any disclaimer, the term of this patent is extended or adjusted under 35 U.S.C. 154(b) by 0 days.

(21) Appl. No.: 16/828,118

(22) Filed: Mar. 24, 2020

(65) Prior Publication Data

US 2020/0314543 A1    Oct. 1, 2020

Related U.S. Application Data

(60) Provisional application No. 62/824,608, filed on Mar. 27, 2019.

(30) Foreign Application Priority Data

Jan. 20, 2020    (JP) .............................. JP2020-006980

(51) Int. Cl.
*H04R 5/04* (2006.01)
*G06F 3/01* (2006.01)
*G06F 3/16* (2006.01)
*H04R 3/00* (2006.01)
*H04R 3/04* (2006.01)
(Continued)

(52) U.S. Cl.
CPC ............... *H04R 5/04* (2013.01); *G06F 3/012* (2013.01); *G06F 3/017* (2013.01); *G06F 3/16* (2013.01); *H04R 3/005* (2013.01); *H04R 3/04* (2013.01)

(58) Field of Classification Search
CPC ..... G10L 21/02; G10L 25/51; G10L 21/0316; H04R 3/00; H04R 3/005; H04R 1/028; H04R 1/406; H04R 5/04; H04R 2499/11; H04R 3/04; H04R 2430/25; G06F 3/012;
(Continued)

(56) References Cited

U.S. PATENT DOCUMENTS

2012/0062729 A1*  3/2012  Hart ...................... H04N 7/142
                                                            348/135
2014/0268016 A1*  9/2014  Chow .................... H04R 3/005
                                                            351/158
(Continued)

FOREIGN PATENT DOCUMENTS

JP        9-327097        12/1997
JP        2009-164747      7/2009
(Continued)

OTHER PUBLICATIONS

Extended European Search Report dated Aug. 20, 2020 in corresponding European Patent Application No. 20166375.4.

*Primary Examiner* — Leshui Zhang
(74) *Attorney, Agent, or Firm* — Wenderoth, Lind & Ponack, L.L.P.

(57) ABSTRACT

A speech input method that includes: detecting whether a user's face is in proximity to a speech input device including at least one microphone; and performing correction processing on an audio signal obtained through sound collection by the at least one microphone when it is detected that the user's face is in proximity to the speech input device.

11 Claims, 6 Drawing Sheets

(51) Int. Cl.
*H04R 1/40* (2006.01)
*G10L 21/0316* (2013.01)
*G10L 25/51* (2013.01)
*G10L 21/02* (2013.01)

(58) Field of Classification Search
CPC . G06F 3/017; G06F 3/16; G06F 3/005; G06F 3/04
USPC ......... 381/26, 92, 91, 122, 111–114; 700/94; 455/3.06, 575.2, 575.3, 575.4, 575.6, 455/575.9
See application file for complete search history.

(56) References Cited

U.S. PATENT DOCUMENTS

2016/0336913 A1* 11/2016 Kuruba Buchannagari ................ H04R 1/1041
2018/0358035 A1* 12/2018 Burke ................... H04W 4/026

FOREIGN PATENT DOCUMENTS

| JP | 2009164747 A * | 7/2009 | ............... H04R 3/00 |
| JP | 2010-50571 | 3/2010 | |
| WO | 2018/217194 | 11/2018 | |

* cited by examiner

SPEECH INPUT METHOD, RECORDING MEDIUM, AND SPEECH INPUT DEVICE

CROSS REFERENCE TO RELATED APPLICATIONS

The present application is based on and claims priority of Japanese Patent Application No. 2020-006980 filed on Jan. 20, 2020 and U.S. Provisional Patent Application No. 62/824,608 filed on Mar. 27, 2019. The entire disclosures of the above-identified applications, including the specifications, drawings and claims are incorporated herein by reference in their entirety.

FIELD

One or more exemplary embodiments disclosed herein relate generally to a speech input method, a recording medium, and a speech input device.

BACKGROUND

Conventionally disclosed is a technology that enables a sound collecting device, which collects voices of a speaker, to collect sound while reducing noise influence (see, for example, Patent Literature (PTL) 1).

CITATION LIST

Patent Literature

[PTL 1] Unexamined Japanese Patent Application Publication No. 2010-50571

SUMMARY

Technical Problem

Nowadays, a person gets a message across to another person in a city, for instance, by translating their utterances collected by a sound collecting device (referred to herein as "speech input device") and displaying or outputting the result of the translation on the display or from the microphone(s) of the speech input device. However, speech recognition is not properly performed due to surrounding noise etc., in some cases, and a user of the speech input device has to bring the device closer to their face (mouth to be specific) to utter a voice again so that speech recognition is performed again. A problem here is that since the user's face is in proximity to the speech input device, speech recognition performance decreases.

In view of this, one non-limiting and exemplary embodiment provides, for instance, a speech input method capable of inhibiting a decrease in speech recognition performance caused by proximity between a user's face and a speech input device.

Solution to Problem

In one general aspect, the techniques disclosed here feature a speech input method including: detecting whether a user's face is in proximity to a speech input device including at least one microphone; and performing correction processing on an audio signal obtained through sound collection by the at least one microphone when it is detected that the user's face is in proximity to the speech input device.

General and specific aspects disclosed above may be implemented using a system, a method, an integrated circuit, a computer program, or a computer-readable recording medium such as a CD-ROM, or any combination of systems, methods, integrated circuits, computer programs, or computer-readable recording media.

Additional benefits and advantages of the disclosed embodiments will be apparent from the Specification and Drawings. The benefits and/or advantages may be individually obtained by the various embodiments and features of the Specification and Drawings, which need not all be provided in order to obtain one or more of such benefits and/or advantages.

Advantageous Effect

The speech input method and so on according to one or more exemplary embodiments or features disclosed herein enable inhibiting a decrease in speech recognition performance caused by proximity between a user's face and a speech input device.

BRIEF DESCRIPTION OF DRAWINGS

These and other advantages and features will become apparent from the following description thereof taken in conjunction with the accompanying Drawings, by way of non-limiting examples of embodiments disclosed herein.

DESCRIPTION OF EMBODIMENTS (Background to the Conception of One Aspect of the Present Disclosure)

First, a background to the conception of one aspect of the present disclosure will be described with reference to FIG. 1.

Figure 1:
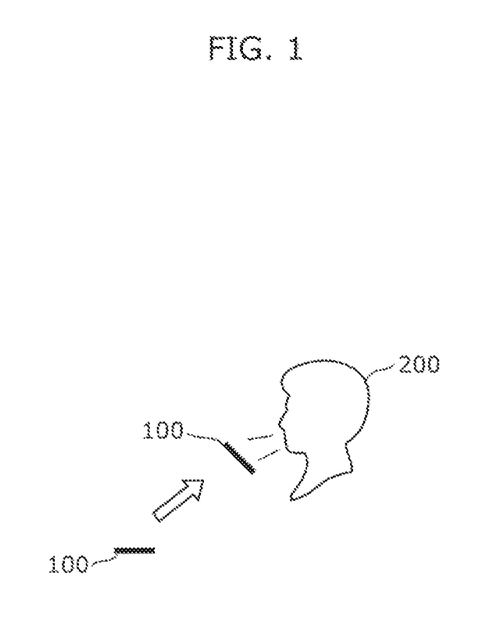
FIG. 1 is a diagram for explaining that proximity between a user's face and a speech input device decreases speech recognition performance.

FIG. 1 is a diagram for explaining that proximity between the face of user 200 and speech input device 100 decreases speech recognition performance.

Speech input device 100 is used, for example, when user 200 gets a message across to a person who does not understand the language that user 200 speaks. Normally, user 200 holds speech input device 100 in front of their chest or thereabouts and makes an utterance that they desire to be translated. With this, speech input device 100 collects the utterance, speech recognition is performed on the utterance by, for example, a server device, and the utterance is translated into a desired language.

However, in some cases, speech recognition is not properly performed, for instance, in a city due to surrounding noise etc. and user 200 has to bring speech input device 100 closer to their face to make an utterance again so that speech recognition is performed again, as illustrated in FIG. 1. When the face of user 200 is in proximity to speech input device 100, the following problems occur. It is to be noted that there is also a case where the face of user 200 comes in proximity to speech input device 100 by user 200 bringing their face closer to speech input device 100.

For example, speech input device 100 includes two microphones at least, and an audio signal obtained through sound collection by the two microphones has single directivity in some cases. In other words, speech input device 100 may have higher sound collection sensitivity in a specific direction. Stated differently, speech input device 100 may have lower sound collection sensitivity in a direction other than the specific direction. When speech input device 100 is held in front of the chest of user 200 or thereabouts, for example, speech input device 100 has higher sound collection sensitivity in a direction toward the face of user 200. Accordingly, when the audio signal has single directivity, speech recognition may not be properly performed because due to proximity between the face of user 200 and speech input device 100, the mouth of user 200 is positioned away from a direction to which speech input device 100 has higher sound collection sensitivity.

Another problem that occurs when the face of user 200 is in proximity to speech input device 100 is that the input signal level of a voice collected by the microphones in speech input device 100 increases and is even saturated depending on a case, and speech recognition is not properly performed in some cases.

Yet another problem that occurs when the face of user 200 is in proximity to speech input device 100 is that the low frequencies of a voice collected by the microphones in speech input device 100 are emphasized due to proximity effect and speech recognition is not properly performed in some cases.

In view of this, according to an exemplary embodiment disclosed herein, a speech input method includes: detecting whether a user's face is in proximity to a speech input device including at least one microphone; and performing correction processing on an audio signal obtained through sound collection by the at least one microphone when it is detected that the user's face is in proximity to the speech input device.

In this way, whether a user's face is in proximity to the speech input device is detected. Therefore, when it is detected that the user's face is in proximity to the speech input device, it is possible to perform correction processing so that a decrease in speech recognition performance caused by proximity between the user's face and the speech input device is inhibited. Accordingly, it is possible to inhibit such a decrease, and this in turn makes it possible, for example, to correctly translate utterances obtained through sound collection.

The at least one microphone may comprise at least two microphones. The audio signal may be obtained through sound collection by the at least two microphones and have single directivity. The correction processing may include a process of converting single directivity into omni-directional directivity.

When the user's face is in proximity to the speech input device, it is easy to achieve a sufficient level of sound collection sensitivity even though an audio signal obtained through sound collection has omni-directional directivity. Accordingly, it is possible to inhibit a decrease in speech recognition performance irrespective of a direction from each of the microphones to the user's face by performing the process of converting single directivity into omni-directional directivity when the user's face is in proximity to the speech input device.

The correction processing may include a process of decreasing gain.

With this, when the user's face is in proximity to the speech input device, the saturation of the input signal level of a voice collected by the microphone(s) in speech input device 100 is inhibited by performing the process of decreasing gain. Accordingly, it is possible to inhibit a decrease in speech recognition performance.

The correction processing may include a process of decreasing gain of a component at a predetermined frequency or lower.

With this, when the user's face is in proximity to the speech input device, an emphasis on low frequencies due to proximity effect is inhibited by performing the process of decreasing the gain of a component at a predetermined frequency or lower (e.g., low frequency component). Accordingly, it is possible to inhibit a decrease in speech recognition performance.

The speech input device may include a triaxial accelerometer. In the detecting, whether the user's face is in proximity to the speech input device may be detected based on a result obtained by comparing a pattern that indicates a temporal change in an output from the triaxial accelerometer with a premeasured pattern.

With this, it is possible to recognize the motion of the speech input device by the triaxial accelerometer included in the speech input device. Previously measuring a pattern indicating a temporal change in an output from the triaxial accelerometer when the speech input device is brought closer to the user's face, in particular, makes it possible to detect that the user's face is in proximity to the speech input device when a pattern similar to the previously measured pattern is output from the triaxial accelerometer.

The speech input device may include a camera. In the detecting, whether the user's face is in proximity to the speech input device may be detected according to a change in a size of the user's face in an image captured by the camera.

The size of the user's face in an image captured by the camera increases when the user's face is in proximity to the speech input device compared to the case where the user's face is not in proximity to the speech input device. Accordingly, it is possible to detect that the user's face is in proximity to the speech input device when the size of the user's face in an image increases.

In the detecting, whether the user's face is in proximity to the speech input device may be detected according to a change in gain of the audio signal obtained through the sound collection.

When the user's face is in proximity to the speech input device, the gain of an audio signal obtained through sound collection may increase. Accordingly, it is possible to detect that the user's face is in proximity to the speech input device when the gain of an audio signal obtained through sound collection increases.

In the detecting, whether the user's face is in proximity to the speech input device may be detected according to a change observed between an average value of gains of the audio signal obtained through the sound collection in a first period, and an average value of gains of the audio signal obtained through the sound collection in a second period following the first period.

Even when the user's face is not in proximity to the speech input device, the gain of an audio signal obtained through sound collection may instantaneously increase in some cases. In view of this, detecting whether the user's face is in proximity to the speech input device according to a change in an average value of the gains of an audio signal obtained through sound collection in a specified period of time enables correct detection.

In the detecting, whether the user's face is in proximity to the speech input device may be detected according to a change in gain of a component at a predetermined frequency or lower of the audio signal obtained through the sound collection.

When the user's face is in proximity to the speech input device, the gain of a component at a predetermined frequency or lower (e.g., low frequency component) of an audio signal obtained through sound collection may increase due to proximity effect. Accordingly, it is possible to detect that the user's face is in proximity to the speech input device when the gain of a component at a predetermined frequency or lower of the audio signal increases.

In the detecting, whether the user's face is in proximity to the speech input device may be detected according to a change observed between an average value of gains of components at the predetermined frequency or lower of the audio signal obtained through the sound collection in a third period and an average value of gains of components at the predetermined frequency or lower of the audio signal obtained through the sound collection in a fourth period following the third period.

Even when the user's face is not in proximity to the speech input device, the gain of an audio signal obtained through sound collection may instantaneously increase in some cases. In view of this, detecting whether the user's face is in proximity to the speech input device according to a change in the average value of the gains of components at a predetermined frequency or lower of an audio signal obtained through sound collection in a specified period of time enables correct detection.

A recording medium according to an exemplary embodiment disclosed herein is a non-transitory computer-readable recording medium for use in a computer, the recording medium having a computer program recorded thereon for causing the computer to execute the speech input method described above.

A speech input device according to an exemplary embodiment disclosed herein is a speech input device including at least one microphone and includes: a detector that detects whether a user's face is in proximity to the speech input device; and a corrector that performs correction processing on an audio signal obtained through sound collection by the at least one microphone when it is detected that the user's face is in proximity to the speech input device.

With such elements, it is possible to provide a speech input device capable of inhibiting a decrease in speech recognition performance caused by proximity between a user's face and the speech input device.

Hereinafter, certain exemplary embodiments will be described in greater detail with reference to the accompanying Drawings.

The exemplary embodiment described below shows a general or specific example. The numerical values, shapes, materials, elements, the arrangement and connection of the elements, steps, the processing order of the steps etc. shown in the following exemplary embodiment are mere examples, and therefore do not limit the scope of the appended Claims and their equivalents.

Embodiment

Hereinafter, an embodiment will be described with reference to FIG. 2 through FIG. 5B.

Figure 2:
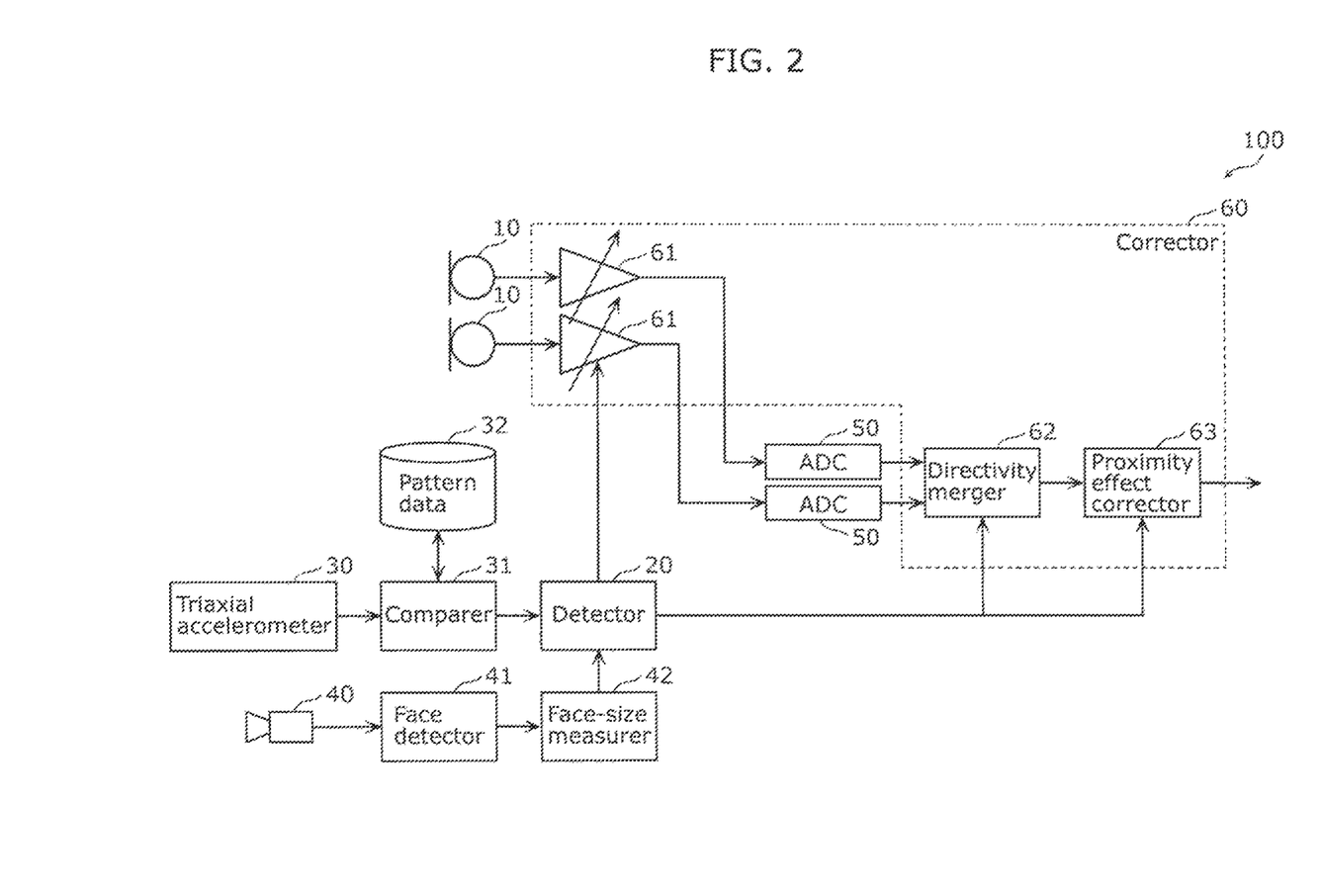
FIG. 2 is a block diagram illustrating an example of a configuration of a speech input device according to an embodiment.

FIG. 2 is a block diagram Illustrating an example of a configuration of speech input device 100 according to the embodiment.

Speech input device 100 is a device which receives a voice uttered by a user of speech input device 100, to perform speech recognition on the voice and, for example, translate the voice. An audio signal indicating the received voice is transmitted, for example, to a server device capable of communicating with speech input device 100, speech recognition and translation are performed on the voice by the server device, and information indicating the translation of the voice is transmitted to speech input device 100. Speech input device 100 outputs the translation of the voice from a loudspeaker of speech input device 100 or display a text presenting the translation on the display of speech input device 100. Speech input device 100 is, for example, a smartphone, a tablet terminal, or a translator exclusively intended for making a translation.

Speech input device 100 includes: at least one microphone; detector 20; triaxial accelerometer 30; comparer 31; pattern data 32; camera 40; face detector 41; face-size measurer 42; analog-to-digital converter (ADC) 50; and corrector 60.

At least one microphone comprises, for example, at least two microphones, and speech input device 100 includes two microphones 10. A voice uttered by the user reaches each of microphones 10 with a time difference. Therefore, by utilizing a positional relationship between microphones 10 and the time difference generated when the voice reaches each of microphones 10, it is possible to obtain, through sound collection, an audio signal having single directivity.

Detector 20 detects whether the face of the user is in proximity to speech input device 100. The details of detector 20 will be described later.

Figure 4A:
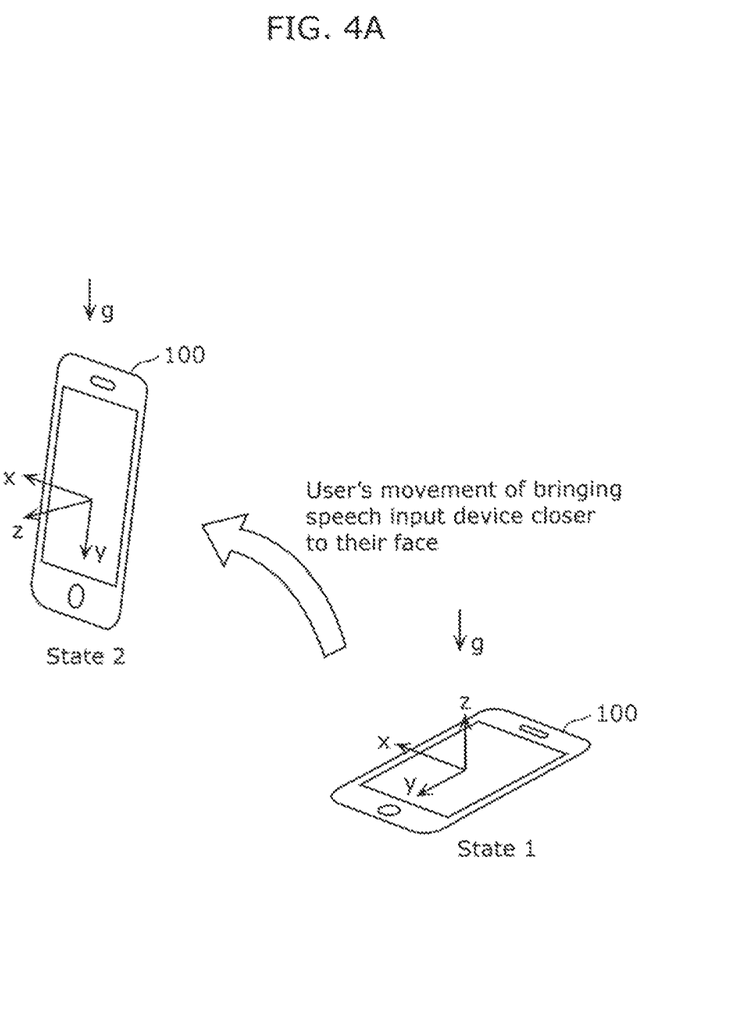
FIG. 4A is a diagram for explaining a force imposed on the speech input device according to the embodiment when the speech input device is brought closer to the user's face.

Triaxial accelerometer 30 is a sensor that detects acceleration with respect to orthogonally intersecting three directions. When speech input device 100 has a tabular shape like a smartphone, as illustrated in FIG. 4A which will be mentioned later, triaxial accelerometer 30 detects acceleration in a lateral direction (x-axis direction) of a tabular-shaped plane, acceleration in a longitudinal direction (y-axis direction) of the tabular-shaped plane, and also acceleration in a direction perpendicular to the tabular-shaped plane (y-axis direction).

Pattern data 32 has previously been measured and indicates a temporal change in an output from triaxial accelerometer 30 when speech input device 100 is brought closer to the user's face. The details of pattern data 32 will be described later.

Comparer 31 compares a pattern indicating a temporal change in an output from triaxial accelerometer 30 with a premeasured pattern. Specifically, triaxial accelerometer 30 detects whether the pattern is similar to the premeasured pattern.

Camera 40 is a device that captures images. Camera 40 is provided, for example, in a position such that the face of the user appears in an image captured by camera 40 when the user holds speech input device 100 in the hand and looks at speech input device 100. In the case where input speech device 100 is a smartphone, for example, camera 40 is provided next to the display of speech input device 100 for capturing the user holding speech input device 100 in the hand.

Face detector 41 detects a user's face in an image captured by camera 40. A method for detecting a user's face in an image is not specifically limited, and a general face detection technique may be used.

Face-size measurer 42 measures the size of a user's face in an image captured by camera 40.

ADC 50 is a circuit that converts an analog signal into a digital signal, and speech input device 100 has two ADCs 50 corresponding to two microphones 10. ADC 50 converts an analog audio signal obtained through sound collection by microphone 10 into a digital audio signal. Note that ADC 50 converts an analog audio signal amplified by amplifier circuit 61 into a digital audio signal, as will be described later.

Corrector 60 includes amplifier circuit 61, directivity merger 62, and proximity effect corrector 63. The details of corrector 60 (amplifier circuit 61, directivity merger 62, and proximity effect corrector 63) will be described later.

Speech input device 100 is a computer that includes a processor (microprocessor), a user interface, a communication interface (e.g., communication circuit not shown in the diagram), a memory, etc. The user interface includes, for example, a display such as a liquid crystal display (LCD) or an input device such as a keyboard or a touch panel. The memory is, for instance, a read only memory (ROM) or a random access memory (RAM), and is cable of storing a program to be executed by a processor. Input speech device 100 may include one memory or plural memories. With the processor operating in accordance with a program, the operations of detector 20, comparer 31, face detector 41, face-size measurer 42, and corrector 60 are realized.

The details of the operations performed by detector 20 and corrector 60 will be described with reference to FIG. 3.

Figure 3:
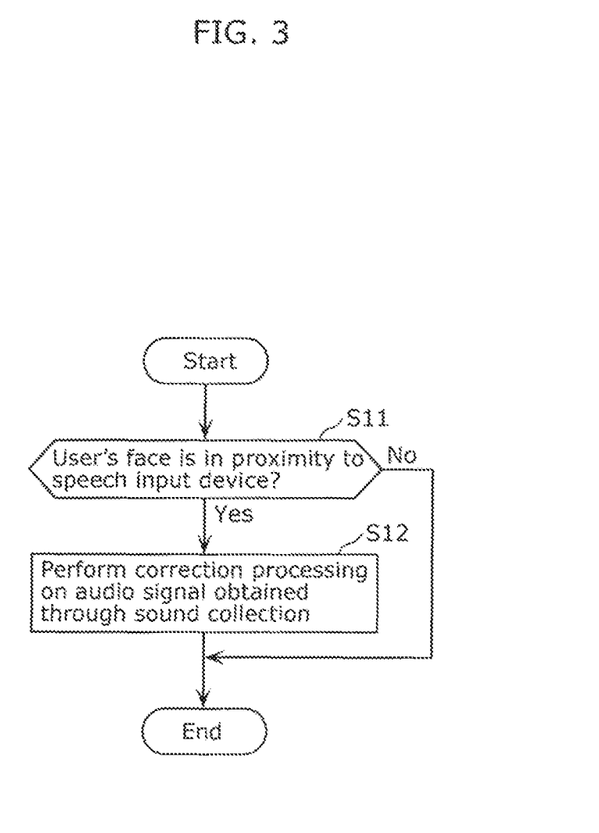
FIG. 3 is a flowchart illustrating an example of a speech input method according to the embodiment.

FIG. 3 is a flowchart showing an example of a speech input method according to the embodiment.

The speech input method includes a detection step (step S11) of detecting whether a user's face is in proximity to speech input device 100 and a correction step (step S12) of performing correction processing on an audio signal obtained through sound collection by at least one microphone when it is detected that the user's face is in proximity to speech input device 100.

The speech input method according to the embodiment is, for example, a method to be executed by speech input device 100. In other words, FIG. 3 is also a flowchart illustrating the operations performed by detector 20 and corrector 60. The detection step corresponds to the operation performed by detector 20, and the correction step corresponds to the operation performed by corrector 60.

Detector 20 determines whether a user's face is in proximity to speech input device 100 (step S11).

Detector 20 detects whether the user's face is in proximity to speech input device 100 according to, for example, a result obtained by comparing a pattern that indicates a temporal change in an output from triaxial accelerometer 30 with a premeasured pattern. This will be described with reference to FIG. 4A and FIG. 4B.

Figure 4B:
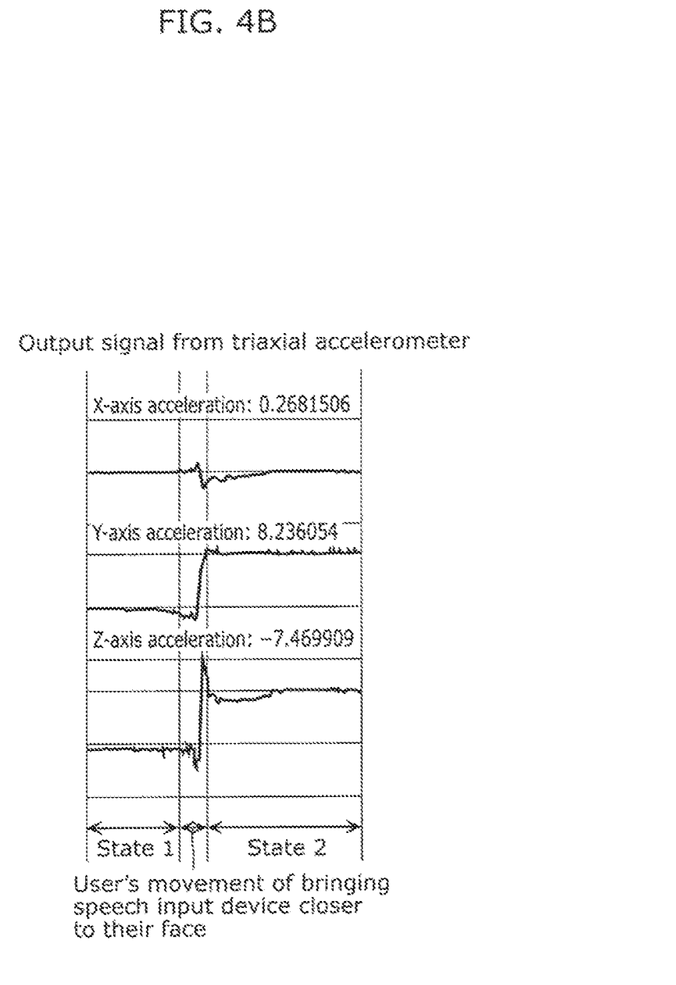
FIG. 4B is a diagram illustrating an example of an output signal from a triaxial accelerometer in the speech input device according to the embodiment when the speech input device is brought closer to the user's face.

FIG. 4A is a diagram for explaining a force imposed on speech input device 100 according to the embodiment when speech input device 100 is brought closer to the user's face. FIG. 4B is a diagram illustrating an example of an output signal of triaxial accelerometer in speech input device 100 according to the embodiment when speech input device 100 is brought closer to the user's face.

As illustrated in FIG. 4A, a user's movement of bringing speech input device 100 closer to the user's face is, for example, a movement of moving speech input device 100 held in a hand of the user in front of the user's chest or thereabouts to the mouth of the user. The movement of bringing speech input device 100 closer to the user's face is, if stated differently, a movement of lifting speech input device 100 that lies along an approximately horizontal direction up so that the display of speech input device 100 faces the user's face. A state in which speech input device 100 lies along the approximately horizontal direction in front of the user's chest or thereabouts is referred to as state 1, and a state in which speech input device 100 is up from the horizontal to about 45 degrees to 90 degrees near the user's face (mouth to be specific) is referred to as state 2.

When speech input device 100 is made to move from state 1 to state 2, triaxial accelerometer 30 outputs a signal as illustrated in FIG. 4B. As described above, in the case where speech input device 100 has a tabular shape like a smartphone, for instance, a lateral direction of a tabular-shaped plane is defined as an x-axis direction, a longitudinal direction of the tabular-shaped plane is defined as a y-axis direction, and a direction perpendicular to the tabular-shaped plane is defined as a z-axis direction, and triaxial accelerometer 30 detects triaxial acceleration in the x-axis, y-axis, and z-axis directions.

In state 1, gravity is imposed on speech input device 100 in the z-axis direction, but hardly any gravity is imposed in the x-axis and y-axis directions. Accordingly, triaxial accelerometer 30 outputs a signal in accordance with gravitational acceleration g for the z-axis direction, and an output is approximately 0 for both of the x-axis direction and the y-axis direction. Nevertheless, a bias force that is strong enough to cancel the gravitational acceleration is applied in the z-axis direction so that all of outputs become 0 for the x-axis, y-axis, and z-axis directions, as illustrated in FIG. 4B.

When speech input device 100 is brought closer to the user's face, as illustrated in FIG. 4A, a force equivalent to that caused by a camera shake is imposed in the x-axis direction, gravity is imposed in the y-axis direction, a force to lift speech input device 100 up from the horizontal is imposed in the z-axis direction. Thus, speech input device 100 is placed in state 2.

When speech input device 100 is thus brought closer to the user's face, a pattern indicating a temporal change in an output from triaxial accelerometer 30 shows a pattern as Indicated in FIG. 4B. Accordingly, by storing in advance, as pattern data 32, the pattern as indicated in FIG. 4B which is a premeasured pattern, it is possible to determine that speech input device 100 is brought closer to the user's face when a pattern similar to the pattern as indicated in FIG. 4B is measured.

Note, however, that how the user brings speech input device 100 closer to their face varies depending on the user. Therefore, various patterns for bringing speech input device 100 closer to a face may be previously measured and various pattern data 32 may be stored.

In this way, when a pattern indicating a temporal change in an output from triaxial accelerometer 30 is similar to a premeasured pattern, detector 20 is capable of detecting that a user's face is in proximity to speech input device 100.

Moreover, detector 20 detects whether the user's face is in proximity to speech input device 100 according to, for example, a change in the size of the user's face in an image captured by camera 40. This will be described with reference to FIG. 5A and FIG. 5B.

Figure 5A:
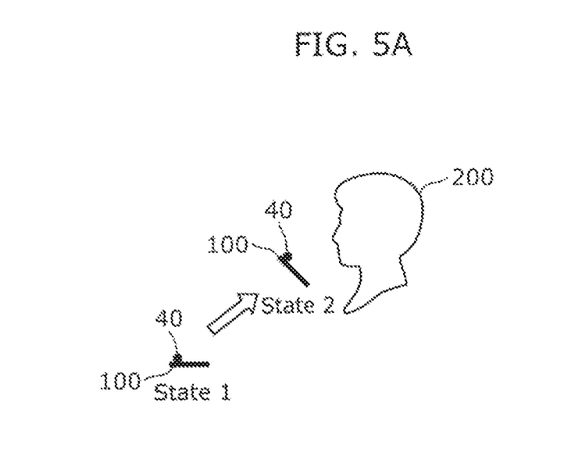
FIG. 5A is a diagram for explaining location and orientation of a camera mounted on the speech input device according to the embodiment when the speech input device is brought closer to the user's face.
Figure 5B:
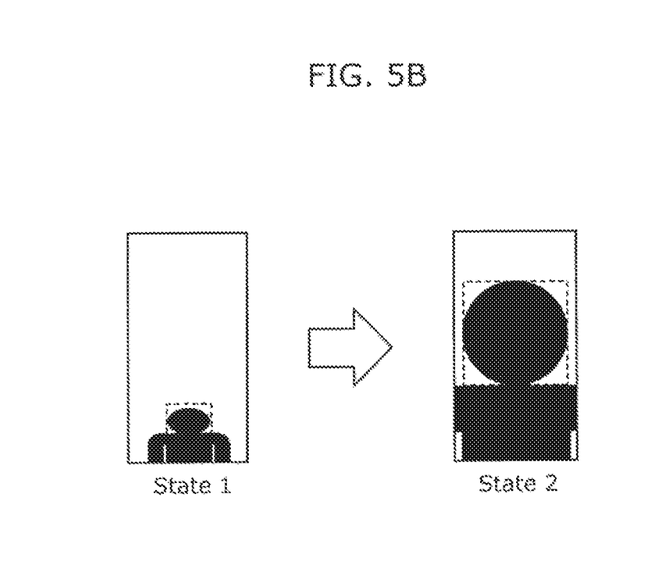
FIG. 5B is a diagram illustrating a change, which is observed when the speech input device according to the embodiment is brought closer to the user's face, in the size of the user's face in an image captured by the camera mounted on the speech input device.

FIG. 5A is a diagram for explaining the location and orientation of camera 40 mounted on speech input device 100 according to the embodiment when speech input device 100 is brought closer to the user's face. FIG. 5B is a diagram illustrating a change in the size of the user's face in an image captured by camera 40 mounted on speech input device 100 according to the embodiment when speech input device 100 is brought closer to the user's face.

When speech input device 100 is in state 1, camera 40 faces upward (e.g., perpendicularly upward) in front of the user's chest or thereabouts, as Illustrated in FIG. 5A. When speech input device 100 is in state 2, camera 40 faces the user near the user's mouth. In state 1, the user's face in an image Is small and compressed in an up-and-down direction, as indicated by a dashed line on the left in FIG. 5B. This is because the location of camera 40 from the user is more distant in state 1 as compared to state 2, and the user's face appears at the edge of a range capturable by camera 40. In contrast, the user's face in an image is large in state 2, as indicated by a dashed line on the right side in FIG. 58.

Thus, detector 20 is capable of detecting that a user's face is in proximity to speech input device 100 when the size of the user's face in an image captured by camera 40 increases.

Detector 20 may detect whether the user's face is in proximity to speech input device 100 according to a change in the gain of an audio signal obtained through sound collection. This is because the gain of the audio signal may increase when the user's face is in proximity to speech input device 100 as compared to the case where the user's face is not in proximity to speech input device 100. Detector 20 detects that the user's face is in proximity to speech input device 100 when the gain of the audio signal obtained through sound collection is a predetermined value (e.g., 10 dB) or greater, for example. Note, however, that even when the user's face is not in proximity to speech input device 100, the gain of the audio signal may instantaneously increase in some cases.

In view of this, detector 20 may detect whether the user's face is in proximity to speech input device 100 according to a change observed between an average value of the gains of the audio signal obtained through sound collection in a first period (e.g., three seconds) and an average value of the gains of the audio signal obtained through sound collection in a second period (e.g., three seconds) following the first period. Detector 20 detects that the user's face is in proximity to speech input device 100, for example, when the time-averaged gain of the audio signal is a predetermined value (e.g., 10 dB) or greater. In this way, detecting whether the user's face is in proximity to speech input device 100 according to a change in the time-averaged gain, in a predetermined period of time, of an audio signal obtained through sound collection allows correct detection.

Moreover, detector 20 may detect whether the user's face is in proximity to speech input device 100 according to a change in the gain of a component at a predetermined frequency or lower of an audio signal obtained through sound collection. This is because when the user's face is in proximity to speech input device 100, the gain of a component at a predetermined frequency or lower (e.g., low frequency component) may increase compared to the case where the user's face is not in proximity to speech input device 100. The gain of a component at a predetermined frequency or lower is, for example, the frequency average of the gains of components at a frequency in the range of from 0 Hz to a predetermined frequency. Detector 20 detects that the user's face is in proximity to speech input device 100, for example, when the gain of a component at a predetermined frequency (e.g., 200 Hz) or lower of an audio signal obtained through sound collection is a predetermined value (e.g., 5 dB) or greater. However, even when the user's face is not in proximity to speech input device 100, the gain of a component at a predetermined frequency or lower of the audio signal may instantaneously increase depending on how the user utters their voice.

In view of this, detector 20 may detect whether the user's face is in proximity to speech input device 100 according to a change observed between an average value of the gains of the audio signal obtained through sound collection in a third period (e.g., three seconds) and an average value of the gains of the audio signal obtained through sound collection in a fourth period (e.g., three seconds) following the third period. Detector 20 detects that the user's face is in proximity to speech input device 100, for example, when the time-averaged gain of components at a predetermined frequency or lower of an audio signal obtained through sound collection is a predetermined value (e.g., 5 dB) or greater. In this way, detecting whether the user's face is in proximity to speech input device 100 according to a change in the time-averaged gain of components at a predetermined frequency or lower of an audio signal obtained through sound collection in a specified period of time allows correct detection.

Moreover, detector 20 may detect whether the user's face is in proximity to speech input device 100 according to whether a voice obtained through sound collection is resonating. This is because when the user's face is in proximity to speech input device 100, a voice obtained through sound collection hardly resonates compared to the case where the user's face is not in proximity to speech input device 100. Whether the voice is resonating may be determined using, for example, autocorrelation. The primary components and the subsequent components increase with more echoes generated. Accordingly, when the user's face is not in proximity to speech input device 100, the primary components and the subsequent components increase. Stated differently, when the user's face is in proximity to speech input device 100, the primary components and the subsequent components decrease. In this way, whether the user's face is in proximity to speech input device 100 may be detected by determining whether a voice obtained through sound collection is resonating, using autocorrelation.

Referring back to the flowchart illustrated in FIG. 3, when it is detected that the user's face is in proximity to speech input device 100 (Yes in step S11), corrector 60 performs correction processing on an audio signal obtained through sound collection by at least one microphone (step S12). As described above, corrector 60 includes amplifier circuit 61, directivity merger 62, and proximity effect corrector 63, and if stated differently, corrector 60 is realized by these elements.

Amplifier circuit 61 is a circuit that amplifies an audio signal (analog audio signal here) that has been input, and has a function to adjust the gain of the audio signal. Amplifier circuit 61 performs a process of decreasing.

Directivity merger 62 adjusts a phase of each of audio signals that have been input (two digital audio signals that have been output from two ADCs 50 here) to adjust directivity. Directivity merger 62 performs a process of converting single directivity into omni-directional directivity.

Proximity effect corrector 63 is an equalizer that changes the frequency characteristic of an audio signal that has been input (an audio signal on which directivity adjustment has been performed by directivity merger 62). Proximity effect corrector 63 performs a process of decreasing the gain of a component at a predetermined frequency or lower (e.g., a low frequency range that is at most 200 Hz).

The correction processing performed by corrector 60 includes the process of converting single directivity into omni-directional directivity performed by directivity merger 62, the process of decreasing gain performed by amplifier circuit 61, and the process of decreasing the gain of a component at a predetermined frequency or lower performed by proximity effect corrector 63.

When it is detected that the user's face is in proximity to speech input device 100, corrector 60 may perform, on an audio signal, the process of decreasing gain, the process of converting single directivity into omni-directional directivity, or the process of decreasing the gain of a component at a predetermined frequency or lower.

Note that corrector 60 does not need to perform all of these processes. Corrector 60 may change a process to be performed as correction processing according to, for example, under what condition detector 20 performs detection. When it is detected that the user's face is in proximity to speech input device 100 since the gain of an audio signal obtained through sound collection is a predetermined value or greater, corrector 60 may perform, as correction processing, only the process of decreasing gain. When it is detected that the user's face is in proximity to speech input device 100 since the gain of a component at a predetermined frequency or lower of an audio signal obtained through sound collection is a predetermined value or greater, corrector 60 may perform, as correction processing, only the process of decreasing the gain of such a component.

Speech input device 100 then outputs, to a server device or other like device, the audio signal on which correction processing has been performed.

In contrast, when it is detected that the user's face is not in proximity to speech input device 100 (No in step S11), corrector 60 does not perform correction processing on the audio signal obtained through sound collection by at least one microphone, and speech input device 100 outputs, for speech recognition to the server device or other like device, the audio signal that has not been subjected to correction processing, for instance.

As has been described above, whether a user's face is in proximity to speech input device 100 is detected. Therefore, when it is detected that the user's face is in proximity to speech input device 100, it is possible to perform correction processing such that inhibits a decrease in speech recognition performance caused by proximity between the user's face and speech input device 100. Accordingly, it is possible to inhibit such a decrease, and this in turn makes it possible, for example, to correctly translate utterances obtained through sound collection.

Other Embodiments

Although the speech input method and speech input device 100 according to one or more exemplary embodiments disclosed herein have been described so far, the present disclosure shall not be limited to the aforementioned embodiment. Forms obtained by various modifications to the foregoing embodiment that can be conceived by a person skilled in the art as well as forms realized by arbitrarily combining structural components and functions in the embodiment within the scope of the essence of the present disclosure are included in one or more exemplary embodiments disclosed herein.

For example, the aforementioned embodiment has described an example that speech input device 100 has two microphones 10, but the present disclosure is not limited to this. Speech input device 100 may include, for example, one microphone or three or more microphones. Speech input device 100 includes amplifier circuit 61 and ADC 50 corresponding to the number of microphones. When speech input device 100 includes one microphone, speech input device 100 does not need to include directivity merger 62.

The aforementioned embodiment has described an example that corrector 60 includes amplifier circuit 60, directivity merger 62, and proximity effect corrector 63, but the present disclosure is not limited to this. Corrector 60 needs to include, for example, at least one of amplifier circuit 61, directivity merger 62, and proximity effect corrector 63.

The aforementioned embodiment has described an example that speech input device 100 includes triaxial accelerometer 30, comparer 31, and pattern data 32, but speech input device 100 does not need to include these elements. In other words, detector 20 does not need to detect whether a user's face is in proximity to speech input device 100 based on a result obtained by comparing a pattern that indicates a temporal change in an output from triaxial accelerometer 30 with a previously measured pattern.

The aforementioned embodiment has described an example that speech input device 100 includes camera 40, face detector 41, and face-size measurer 42, but speech input device 100 does not need to include these elements. In other words, detector 20 does not need to detect whether a user's face is in proximity to speech input device 100 according to, for example, a change in the size of the user's face in an image captured by camera 40.

The present disclosure may be realized, for example, as a server device that executes the speech input method described in the aforementioned embodiment. The server device may include detector 20, comparer 31, pattern data 32, face detector 41, face-size measurer 42, directivity merger 62, proximity effect corrector 60, etc. In other words, the server device may have functions other than those achieved by microphone 10, triaxial accelerometer 30, camera 40, etc. included in speech input device 100.

The present disclosure can be realized as a program for causing a processor to execute the steps included in the speech input method described in the aforementioned embodiment. Furthermore, the present disclosure can be realized as a non-transitory computer-readable storage medium such as a CD-ROM in which the program is recorded.

In the case where the present disclosure is realized using a program (software), for example, each of the steps is executed by the program being executed using hardware resources such as a CPU, a memory, an input/output circuit, etc. included in a computer. In other words, each of the steps is executed by the CPU obtaining data from the memory, input/output circuit, etc. and then computing, or outputting the computing result to the memory, input/output circuit, etc.

It should be noted that in the aforementioned embodiment, each element may be configured by dedicated hardware or may be realized by executing a software program suitable for each element. Each of the elements may be implemented by a program executor such as a CPU or a processor reading and executing a software program recorded on a recording medium such as a hard disc or a semiconductor memory.

Part or all of the functions of speech input device 100 according to the aforementioned embodiment are typically realized as an LSI which is an integrated circuit. These circuits may be individually realized as one chip or may be realized as one chip including part or all of the circuits. Each of the processing units to be realized as an integrated circuit is not limited to an LSI and may be realized as a dedicated circuit or a general-purpose processor. A field programmable gate array (FPGA) which can be programmed after an LSI is manufactured or a reconfigurable processor which can reconfigure connection or setting of circuit cells inside an LSI may be used.

Forms obtained by various modifications to the foregoing embodiment that can be conceived by a person skilled in the art as well as forms realized by arbitrarily combining structural components and functions in the embodiment within the scope of the essence of the present disclosure are included in the present disclosure.

The herein disclosed subject matter is to be considered descriptive and illustrative only, and the appended Claims are of a scope intended to cover and encompass not only the particular embodiment(s) disclosed, but also equivalent structures, methods, and/or uses.

INDUSTRIAL APPLICABILITY

A speech input method according to one exemplary embodiment disclosed herein is applicable to, for example, portable devices such as smartphones, tablet terminals, or translators used for translating voices.

The invention claimed is:

1. A speech input method, comprising:
   detecting whether a user's face is in proximity to a portable speech input device including one or more microphones; and
   performing correction processing on an audio signal obtained through a sound collection by the one or more microphones when it is detected that the user's face is in proximity to the portable speech input device,
   wherein the audio signal is obtained through the sound collection by the one or more microphones and has a single directivity,
   the correction processing includes a process of converting the single directivity into an omni-directional directivity to sense a user's voice,
   in the detecting, the portable speech input device is used in a state in which a positional relationship between the portable speech input device and the user's face is variable, and
   in the detecting of whether the user's face is in proximity to the portable speech input device, the detecting is performed by determining whether a voice obtained through a sound collection is resonating, using autocorrelation.

2. The speech input method according to claim 1, wherein the correction processing includes a process of decreasing gain.

3. The speech input method according to claim 1, wherein the correction processing includes a process of decreasing gain of a component at a predetermined frequency or lower.

4. The speech input method according to claim 1, wherein the speech input device includes a triaxial accelerometer, and
   in the detecting whether the user's face is in proximity to the speech input device, the detecting is based on a result obtained by comparing a pattern that indicates a temporal change in an output from the triaxial accelerometer with a premeasured pattern.

5. The speech input method according to claim 1, wherein the speech input device includes a camera, and
   in the detecting whether the user's face is in proximity to the speech input device, the detecting is performed according to a change in a size of the user's face in an image captured by the camera.

6. The speech input method according to claim 1, wherein in the detecting whether the user's face is in proximity to the speech input device, the detecting is performed according to a change in gain of the audio signal obtained through the sound collection.

7. The speech input method according to claim 6, wherein in the detecting whether the user's face is in proximity to the speech input device, the detecting is performed according to a change observed between an average value of gains of the audio signal obtained through the sound collection in a first period, and an average value of gains of the audio signal obtained through the sound collection in a second period following the first period.

8. The speech input method according to claim 1, wherein In the detecting whether the user's face is in proximity to the speech input device, the detecting is performed according to a change in gain of a component at a predetermined frequency or lower frequency of the audio signal obtained through the sound collection.

9. The speech input method according to claim 8, wherein in the detecting whether the user's face is in proximity to the speech input device, the detecting is performed according to a change observed between an average value of gains of components at the predetermined frequency or lower frequency of the audio signal obtained through the sound collection in a third period and an average value of gains of components at the predetermined frequency or lower frequency of the audio signal obtained through the sound collection in a fourth period following the third period.

10. A non-transitory computer-readable recording medium for use in a computer, the recording medium having a computer program recorded thereon for causing the computer to execute the speech input method according to claim 1.

11. A speech input device including one or more microphones, the speech input device comprising:
    a detector that detects whether a user's face is in proximity to the speech input device; and
    a corrector that performs correction processing on an audio signal obtained through a sound collection by the one or more microphones when it is detected that the user's face is in proximity to the speech input device,
    wherein the audio signal is obtained through the sound collection by the one or more microphones and has a single directivity,
    the correction processing performed by the corrector includes a process of converting the single directivity into an omni-directional directivity to sense a user's voice,
    the speech input device is a portable device used in a state in which a positional relationship between the speech input device and the user's face is variable, and
    the detector detects whether the user's face is in proximity to the speech input device by detecting whether a voice obtained through a sound collection is resonating, using autocorrelation.

* * * * *